INVENTOR
LESTER J. PETERS
BY E. A. Buchan
ATTORNEY

May 16, 1950          L. J. PETERS          2,507,644
HYDRAULICALLY-SHIFTABLE-SAW EDGER MACHINE
Filed Sept. 26, 1947          5 Sheets-Sheet 4

INVENTOR.
LESTER J. PETERS
BY
E. A. Buxton
ATTORNEY

May 16, 1950     L. J. PETERS     2,507,644
HYDRAULICALLY-SHIFTABLE-SAW EDGER MACHINE
Filed Sept. 26, 1947     5 Sheets-Sheet 5
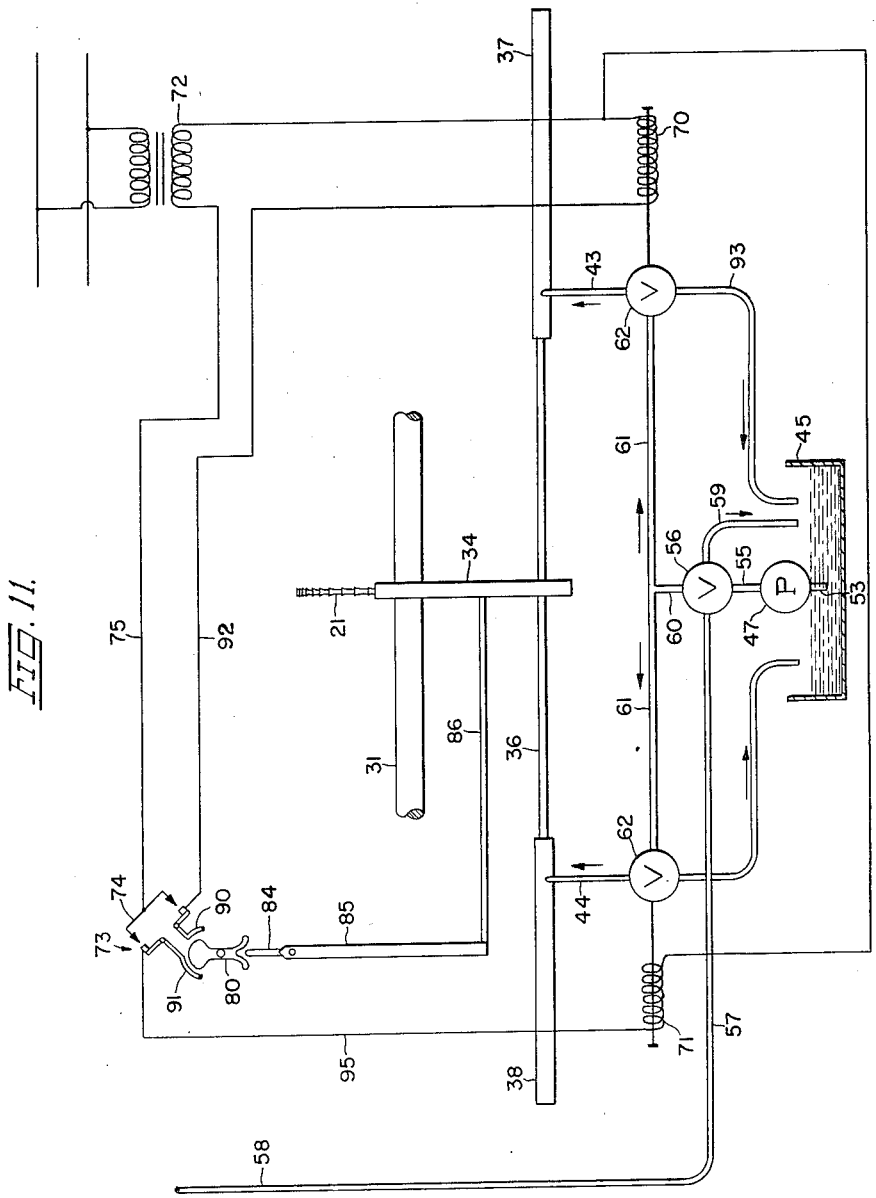
INVENTOR
LESTER J. PETERS
BY
ATTORNEY Patented May 16, 1950

2,507,644

UNITED STATES PATENT OFFICE 2,507,644

HYDRAULICALLY-SHIFTABLE-SAW EDGER MACHINE

Lester J. Peters, Portland, Oreg.; Dora H. Peters executrix of said Lester J. Peters, deceased Application September 26, 1947, Serial No. 776,184

7 Claims. (Cl. 143—37)

My present invention relates to an edger for trimming the edges of slabs as they come from a sawmill. The invention may be of utility in other fields, for example in subdividing and trimming sheets of board made of fibrous stock, and subdividing plywood sheets, or in any other similar field of activity.

The principal object of the present invention is to increase the output per man hour of a sawmill. Many improvements have been made in sawmill machinery whereby the number of board feet of logs capable of being cut into slabs of rough stock has been materially increased. The object of the present invention is to provide an edger or subdivider of materially increased operating characteristics whereby the production of board stock is kept up with the increased production of slab stock resulting from the improvements in the sawmill.

The principal object of the present invention is to provide means for controlling a shiftable saw or saws in a rapid and accurate manner. By the use of the present invention, the edger operator is able to set the edger to handle slabs as fast as they come to the edger from the sawmill. In edging operations an experienced operator quickly judges the amount of waste edge which must be cut from a slab in order to provide a rectangular board free of beveled irregular edges and the widths and number of boards which may be cut from a slab, regardless of the irregularities thereof, or the amount of taper from butt to tree top end of the slab. If the slab is relatively narrow it might be that only one standard board could be cut from the slab, but if narrow stock is desired, or if a wide slab is being trimmed, a plurality of standard boards may be formed therefrom. Board widths are more or less standardized at the present time but the operator may have a choice of possible combinations of board widths in order to utilize the greatest amount of the slab. It is a primary object of the present invention to make the setting of at least one, or perhaps several, of a gang of saws so simple and so quickly accomplished that there would be no excuse for inefficient trimming or division of each slab.

A further object of the present invention is to provide an edger and subdivider which may be operated to feed in a forward direction or in a reverse direction so as to enable the operator to remove broken slabs which might have become jammed in the equipment, or to retrieve a trimmed section and further subdivide it into smaller boards. A further object of the present invention is to provide an edger with feeding means including driven rolls and superimposed press rolls which are forced against the top of the slab by hydraulic means permitting floating action of the press rolls, in order to avoid damage in the event that a section of trim or the like would become lodged on top of the slab being trimmed.

A further object of the present invention is to provide an edger with means whereby the positions of the saws are set by hydraulically operated means including a pump driven by the motor driving saws so that only one connection to the edger need be achieved, that is the connection between the edger and the motive means therefor, thus permitting rapid displacement of the edger from position to position as is the practice in modern portable sawmill operations.

A further object of the present invention is to provide an edger with a fluted arbor upon which a plurality of saws are slidably mounted, and a frame for mounting the arbor, the connection between the frame and the arbor being of such character that rapid removal of the arbor and replacement thereof by a substitute arbor is readily permitted. This object prevents delays of long duration, since if a saw or saws should become dull or damaged an entire substitute arbor may be set to work within a relatively short period of time. It is therefore an object of the present invention to provide an edger with means whereby quick interchangeability of saw assemblies may be accomplished.

A further object of the present invention is to provide an edger wherein alignment of the saws and feed rolls may be rapidly and easily accomplished.

A further object of the present invention is to provide means whereby the safety of the sawmill operation is enhanced, the construction being such that a break in the slab being trimmed will not result in the propulsion of broken pieces of board into the zones occupied by the operators of the sawmill.

The foregoing and other objects and advantages of the present invention will be more readily understood by reference to the accompanying drawings wherein a preferred embodiment of the invention is illustrated, taken in connection with the following specification referring to the drawings by like numerals throughout, while the features of novelty will be more particularly pointed out in the appended claims.

In the drawings—

Fig. 7 (sheet 3) is a horizontal section on an enlarged scale taken substantially along line 7—7 of Fig. 5;

Fig. 8 is a vertical section on an enlarged scale taken substantially along line 8—8 of Fig. 1;

Fig. 9 is a vertical section taken substantially along line 9—9 of Fig. 8 and illustrating a saw controlling switch in neutral position;

Fig. 11 is a schematic diagram illustrating the connection of a saw to a saw shifting means and saw controlling switch.

Figure 1:
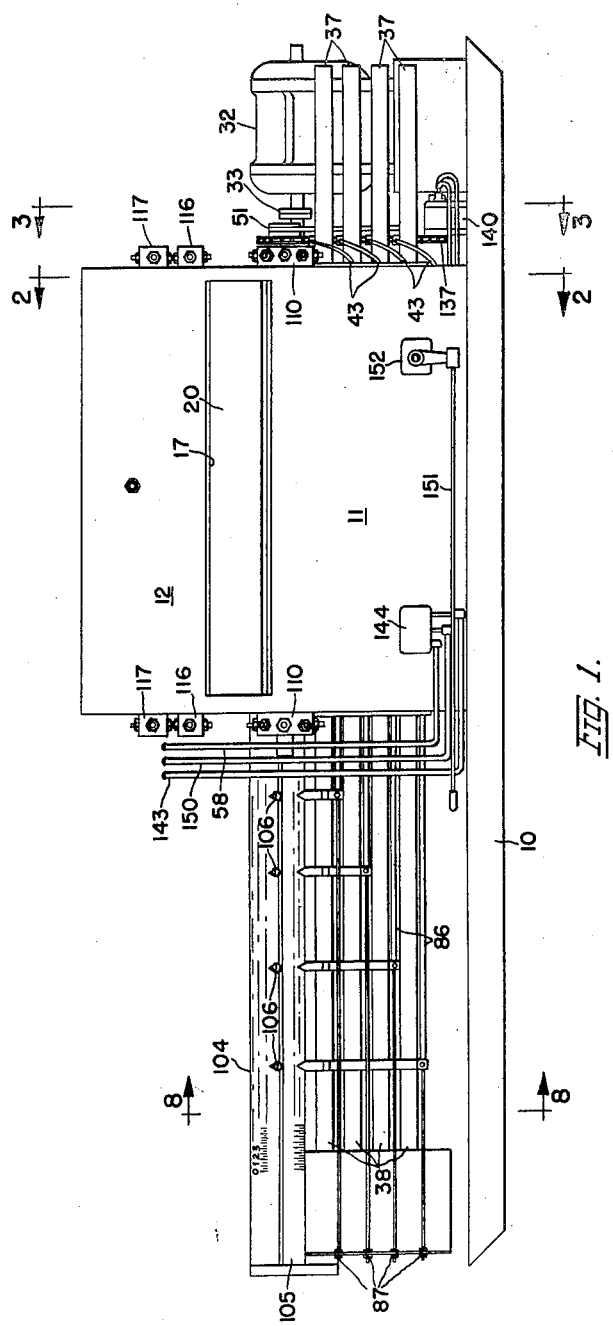
Fig. 1 is a front view in elevation of an edger made in accordance with the present invention.

The present invention preferably comprises a platform 10 made in the form of a skid whereby the edger may be moved from locality to locality or slid up and down ramps leading to the top of the usual sawmill framework. Mounted upon the skid is a substantially hollow frame comprising a front lower wall 11, a front upper wall 12, a rear lower wall 13, and a rear upper wall 15, and a removable access plate 16 forming, with the inwardly bent portions of the upper front and rear walls 12 and 15, a top wall. The front wall is provided with short, inwardly extending flanges forming a rectangular opening 17 and the rear wall is provided with a similarly formed opening 18 in alignment with the opening 17. A slab to be trimmed is fed into the opening 17 between a fluted feed roll 19 and a press roll 20 and into engagement with a plurality of saws 21 by means of which it is trimmed or subdivided. The trimmed pieces pass between a fluted feed roll 22 and an upper press roll 23 and out of the edger through the opening 18.

*Saw control*

Figure 5:
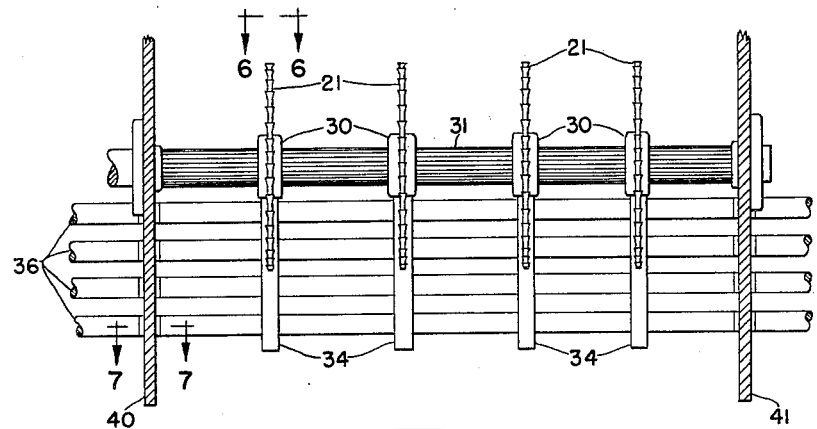
Fig. 5 is a vertical section taken substantially along line 5—5 of Fig. 3.
Figure 6:
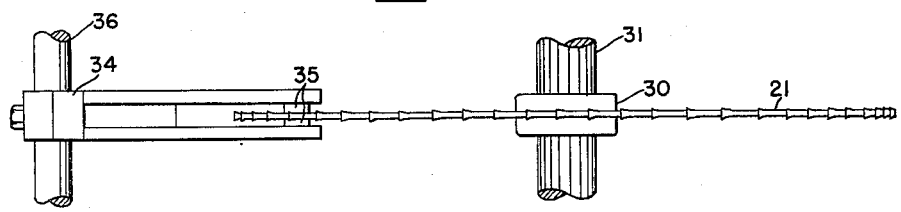
Fig. 6 is a horizontal section on an enlarged scale taken substantially along line 6—6 of Fig. 5.

As seen in Figs. 2, 4, 5 and 6 the saws 21, which are preferably four in number but may be more or less if desired, comprise toothed discs which are mounted upon hubs 30. The hubs are provided with splines engaging in the grooves of the fluted arbor 31 so that the saws may be shifted longitudinally of the arbor while being driven thereby. The arbor 31 is connected to the shaft of a motor 32, or other prime mover, through a flexible couple 33 (Fig. 1). The motor 32 is employed where a source of power such as a movable generating unit or nearby power line is available, but any prime mover such as an internal combustion engine may be substituted therefor. Each saw is straddled by a saw shifting member preferably comprising a pair of arms extending forwardly from the top of a vertical split bar 34. The arms are spaced to provide a slot wide enough to receive the saw blade and the forward extremities thereof are provided with hardwood or fiber inserts 35 which lightly brush the smooth surface of the saw. Lateral shifting of the split bar 34 will therefore result in shifting of the saw along the arbor 31. The split bar 34 is clamped about a plurality of piston rods 36 extending parallel to the arbor 31 and positioned in a vertical row. As seen in Fig. 5, there are four shifting members, one for each saw, and one of each of the piston rods 36 is connected to one of the saws through one of the shifting members. The split block 34 is provided with openings therethrough, one of which is of smaller diameter than the other three so that it may be clamped to one of the piston rods to be moved thereby while being slidably guided by the other three.

The piston rods 36 extend through packing glands mounted on the end walls 40 and 41 of the frame of the machine (Fig. 7) into cylinders 37 and 38 respectively. Fluid under pressure may be forced into the cylinders 37 through tubes 43 to force the piston rods to move in a forward direction or toward the right of Fig. 1, or fluid may be forced into the cylinders 38 through similar connections 44 (Fig. 11) to cause the piston rods to move toward the left of Fig. 1.

The fluid for operating the piston rods 36 is contained in a sump 45 mounted inside of the lower rear wall 13, the sump being provided with a removable access door 46. A pump 47 is mounted in the sump and driven by a shaft 48 which extends through the wall 40 and supports a pulley 50 which is connected by belt 51 to a pulley 52 mounted on arbor 31. The pump draws fluid from the sump through its suction inlet 53 and forces it through a pressure tube 55 into a two-way valve 56 (Fig. 11). The valve 56 is controlled by a rod 57 having a lever 58 extending upwardly therefrom at the left end of the frame. When the lever is in its normal position the valve 56 causes the output of the pump to return to the sump through a return tube 59. When the lever 58 is shifted to operating position the return tube is closed and the output of the pump goes to a supply tube 60 having a plurality of branches 61 leading to a plurality of solenoid valves 62. There is a pair of valves 62 for each piston 36, only one pair being illustrated in Fig. 11 for the sake of simplicity.

Figure 2:
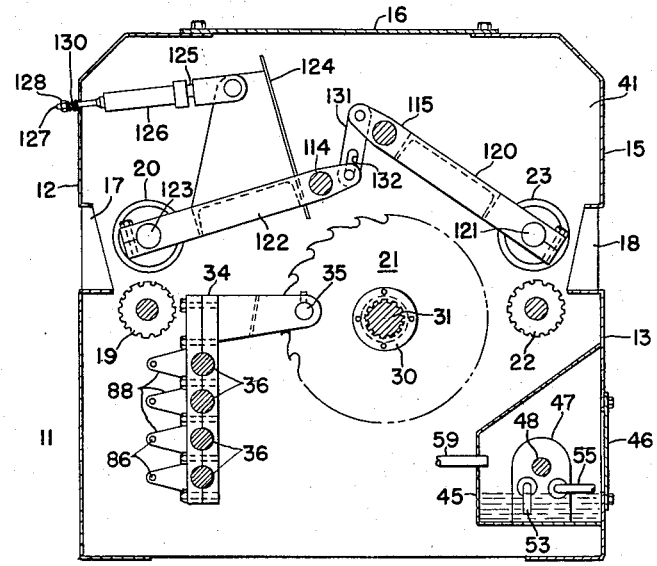
Fig. 2 is a vertical section taken substantially along line 2—2 of Fig. 1.
Figure 10:
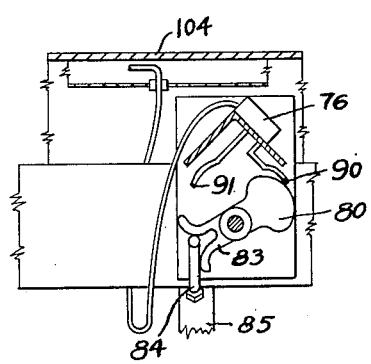
Fig. 10 (sheet 4) is a view similar to Fig. 9 showing the switch in one operating position.

One of the valves 62 of each pair is controlled by a solenoid 70 and the other by a solenoid 71. The solenoids are arranged in parallel in a valve controlling circuit including a source of current such as the transformer 72 and a two-way switch 73. The switch 73 includes a double contact 74 connected by wire 75 with one side of the output coil of the transformer 72. The contact 74 is located in a box 76 (Figs. 8 to 10) mounted upon a plate 77 bridging the gap between a rear plate 78 and a front plate 79 and forming part of a housing for a switch arm 80 fixed to a rod 81 extending between plates 78 and 79. Arm 80 is in frictional engagement with a fixed friction device 82 so as to be held thereby in any of several selected positions. Fixed to the rod 81 and depending therefrom is a bifurcated member 83 having outwardly curved arms defining a notch therebetween in which may be received the end of a switch operator comprising a rod 84 extending rearwardly from a vertical bar 85. The bar 85 is fixed to a piston control tube 86 (Fig. 11) guided by a rod 87 (Fig. 1). The tube extends through the wall 41 and is attached to a lug 88 extending from one of the split bars 34 (Fig. 2). Accordingly as the piston rod 36 moves the switch operator 84 is moved to the same extent in the same direction, thus rocking the bifurcated member 83 from a neutral vertical position illustrated in Fig. 9 to one side or the other as illustrated in Fig. 10, the switch arm being held in any of the positions by frictional engagement thereof with the friction member 82. The upper end of the operating arm 80 is rounded and shaped to engage with one or the other of a pair of contact arms 90 and 91 extending into the switch box 76 in position to complete circuits including the double contact 74. If the member 90 is moved to closed position a circuit is completed including the wire 92 and solenoid 70 to thereby move valve 62 from its normal position in which tube 43 is connected to a drain tube 93 leading to the sump 45 and the supply tube 61 is closed to an operating position in which supply tube 61 is connected to cylinder 37 and the drain tube 93 is closed. If the member 91 is moved to closed position a circuit is completed including wire 95, solenoid 71 and transformer 72, thereby causing fluid to flow into the cylinder 38. The members 90 and 91 are arranged in any convenient manner to move to switch opening position when released by the operating arm 80. Further details of the switches and valves are thought to be unnecessary since many such devices are known and readily available. Likewise pressure relief valves for preventing damage are not herein illustrated.

The plate 79 is mounted upon a carriage 100 (Fig. 8) having wheels 101 thereon engageable with a hollow bar 102 having a longitudinal slot in the bottom thereof through which the upper ends of the bars 85 extend, each bar being supported, such as by means of a pair of wheels 103 riding in the hollow bar on opposite sides of the slot therethrough. The bar 102 is mounted within a support including a sloping wall 104 having a scale therealong and a vertical front wall 105 having an identical scale therealong. The sloping wall 104 is provided with a longitudinal slot through which extends a manually engageable knob 106 fixed to the carriage 100 and supporting a pointer 107 movable past the scale on wall 104. A pointer 108 is fastened to each vertical bar 85 and moves along the scale on vertical wall 105.

*Operation of saw shifting mechanism*

When the operator determines the amount of trim and the width of the boards which may be cut from a slab he moves one or several of the carriages 100 to the points indicated by the scale on wall 104. Movement of a carriage causes the switch operator 84 to swing the switch operating arm 80 from the position shown in Fig. 9 to a position such as shown in Fig. 10, thereby completing a circuit to one of the solenoids 70 or 71 and opening the valve 62 associated therewith. The operator then shifts lever 58 to connect the pump to the selected cylinder whereupon the piston rod 36 and saw 21 move in the direction in which the carriage 100 has been moved until the switch operator 84 engages the bifurcated arm 83 and swings the switch arm 80 to a neutral position, whereupon the solenoid valve is closed and the output of the pump returns to the sump. Thereafter lever 58 may be shifted to close valve 56 and cause the pump output to return to the sump. The movement of the saw shifter at the same time shifts the vertical pointer 108 along the scale on vertical wall 105 so that the operator may determine that the saw has moved to the exact point desired. The saw blades remain running while shifting takes place and the shifting may occur in a very short period of time.

*Feeding mechanism*

Figure 3:
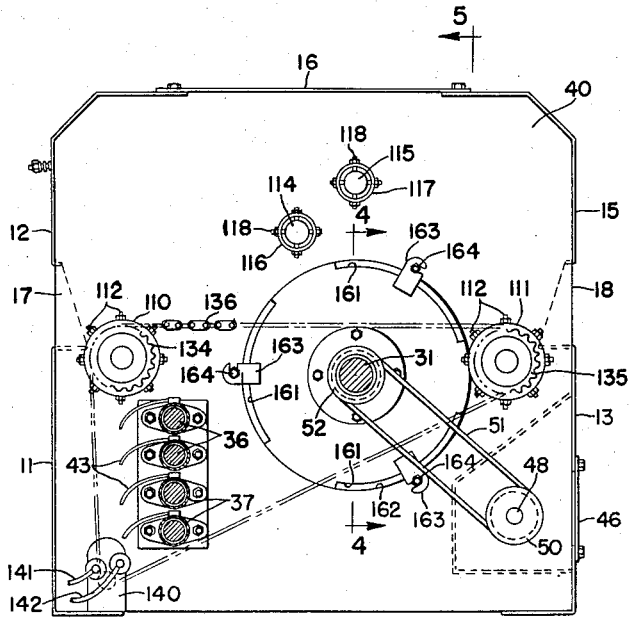
Fig. 3 is a vertical section taken substantially along line 3—3 of Fig. 1.
Figure 4:
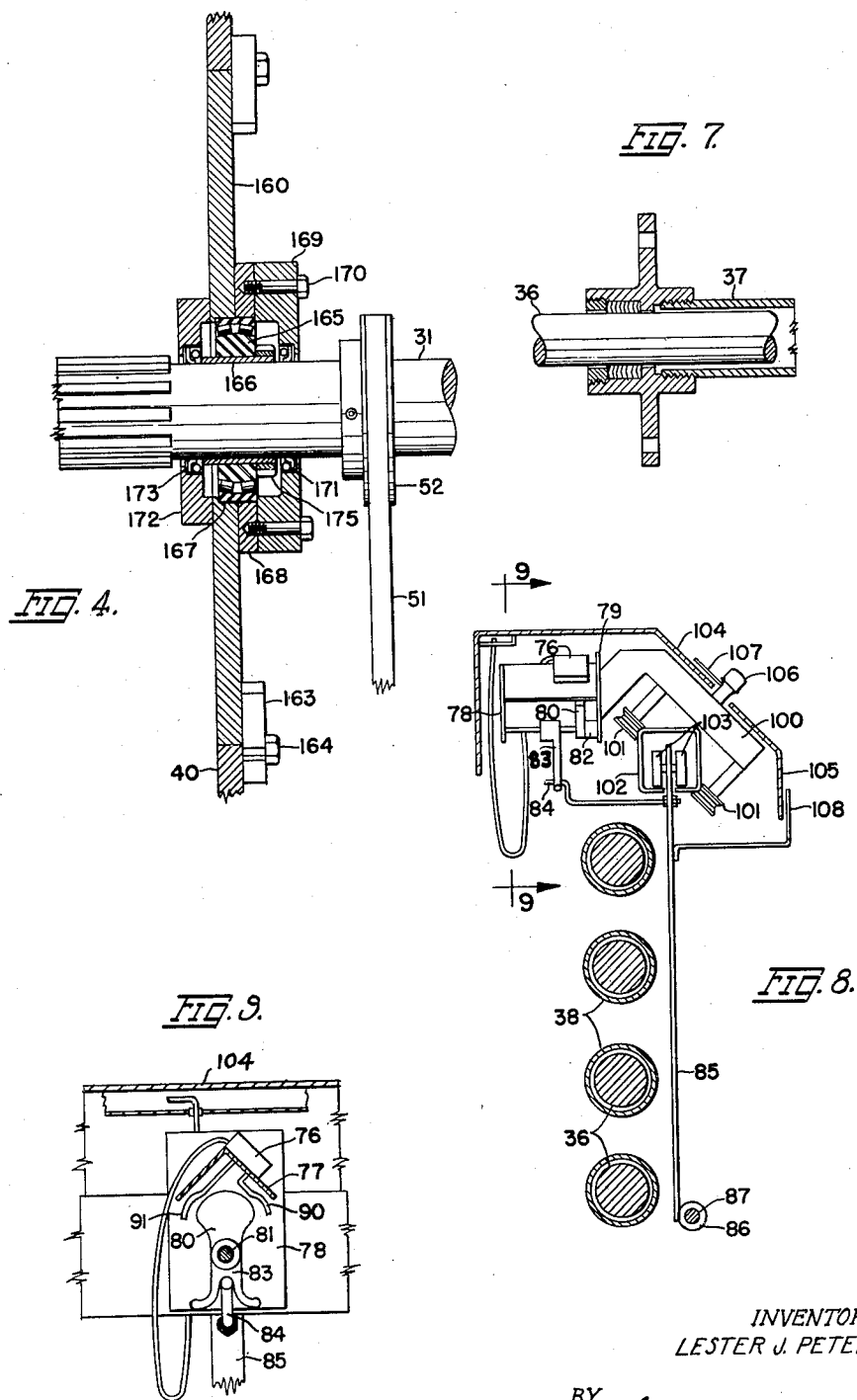
Fig. 4 is a vertical section taken substantially along line 4—4 of Fig. 3.

The shafts of roll 19 and 22 extend through the end walls 40 and 41 and are journaled in ring bearings mounted in collars 110 and 111 (Fig. 3) respectively through which extend a plurality of studs 112 by means of which alignment of the feed rolls with the arbor 31 may be accomplished. The openings through the walls in which the rings are mounted are preferably of such diameter as to permit endwise dislocation of the feed rolls. Above the saw blades there is mounted a pair of heavy rods 114 and 115, the rods extending through rings 116 and 117 respectively which support a plurality of adjusting studs 118 whereby alignment of the rods 115 and 116 may be rapidly accomplished. The rod 115 pivotally supports a pair of levers 120 (Fig. 2) suitably connected to move as a unit and which embrace the ends of a shaft 121 supporting the press roll 23, and the rod 114 supports a similar pair of levers 122 connected together to move as a unit and which support a shaft 123 upon which press roll 20 is mounted. A bracket 124 extends upward from the frame connecting levers 122 and pivotally supports an end of a piston 125 which extends into a cylinder 126. The end of cylinder 126 is provided with a rod 127 which extends through an opening in wall 12 and has an adjustable nut 128 mounted thereon, the nut retaining a spring 130 under compression against the wall 12. A link 131 is pivoted at its upper end to a rod between the short arms of levers 120 and is provided with a slot 132 embracing a pivot rod connecting the short arms of levers 122.

The shafts of feed rolls 19 and 22 mount a pair of sprocket gears 134 (Fig. 3) and 135 respectively which engage a sprocket chain 136 extending thereabout and which also engage a sprocket gear 137 (Fig. 1) on the shaft of a fluid motor 140 mounted on the skid. The fluid motor is connected to a source of fluid pressure, such as the pump 47 through a tube 141 and a tube 142 leading back to fluid storage, such as sump 45. A lever 143 is connected to a valve in a valve housing 144 which encloses other valves, as for example the valve 56 operated by lever 58, for controlling the admission of fluid under pressure to the fluid motor 140 and the direction of flow thereof. As is well known in the art many fluid motors may operate in either direction so that fluid might flow through tube 141 into the motor and back to the sump through tube 142, or the reverse, as controlled by the position of lever 143. Lever 143 may also be shifted to a neutral position to stop the flow of fluid to the motor so that the rolls may remain stationary. Details of many valves for controlling the motor 140 are known to the art.

The cylinder 126 may likewise be connected to a source of fluid pressure such as the pump 47 under control of a lever 150 extending to a valve in valve housing 144 and so arranged as to extend piston 125 when it is desired to lower the rolls into engagement with the upper surface of the slab being fed by rollers 19 and 22. The spring 130 may yield to accommodate irregularities in slab thickness too small to justify a change in the setting of the press rolls, or to permit yielding of the press rolls in the event that some obstruction such as a piece of trim should accidentally become caught between the slab and the press rolls or feed rolls.

A horizontal lever 151 extends to an accessible but not readily convenient position and may be engaged by the operator to shift a pressure reducing valve 152 located in the supply line to the fluid motor 140, thereby permitting alteration of the speed of the feed rolls and therefore the rate of feed of the slab into the saws. This is desirable to permit fast feeding of thin slabs and slower feeding of thick slabs for most efficient operation of the saws without damage to the wood.

It is to be remarked that the framing connecting the levers 120 and levers 122 is preferably very rugged and in the shape of heavy channel members so that any pieces of wood which might be thrown upward due to breakage of the slab or the like will be arrested rather than projected through the walls of the frame.

As soon as the operator has set the saws at the desired position he may start the slab into the edger by positioning it between the rolls 19 and 20 which feed the slab forward at the desired rate into the saws 21, the separated strips being thereafter engaged by the exit rolls and fed from the edger. The speed of feeding may be rapidly adjusted if desired. If the operator should desire to further divide one or more pieces, he may reverse the direction of rotation of the feed rolls as soon as the noise of the saw ceases, whereupon the pieces will be fed back to him at the front of the machine. He may thereupon readjust the saws and send the pieces through the machine for further division.

Saw arbor mounting

Each end of the arbor 31 passes through a mounting disc 160 (Fig. 4) which is provided with a plurality of recesses 161 (Fig. 3) along its periphery to provide a plurality of spaced lands which may be machined accurately to fit into a circular opening 162 cut through the end wall of the frame. Adjacent the center of each recess there is provided a hook 163 adapted to embrace bolts 164 threaded into the end wall. The narrow width of the lands between the recesses 161 permits accurate machining and easy placement of the disc 160 in its respective opening, and rotation thereof to engage the hooks 163 with the studs 164, whereupon the studs 164 may be tightened to hold the disc in position. An inner bearing raceway 165 is firmly seated upon a collar 166 fastened about the arbor 31 by methods involving differential heating and subsequent cooling to assure firm frictional engagement. The raceway is preferably of the double tapered type to engage combination thrust and rotation bearing rollers retained in an outer raceway 167 which is adapted to be mounted in an annular recess in a central opening through the disc 160 and a collar 168 reinforcing the edge of the opening. A second collar 169 is bolted to the collar 168 by bolts 170 and seats an oil seal 171. A similar collar 172 is welded to the inner surface of the disc and seats an oil seal 173. A retainer or spacer 175 may be mounted upon the collar 166 to position the inner raceway 165.

In order to replace broken or dull saws the flexible coupling 33 and belt 51 may be disconnected. The end caps 169 may then be slipped off of the shaft to permit disengagement of the locking collars 175. The bolts 164 may be loosened and the discs 160 partially rotated to disengage the hooks 163 whereupon the discs 160 may be removed by sliding them longitudinally of the shaft. The arbor with its saws may now be withdrawn from the frame and a substitute arbor and saws may be mounted in position, or substitute saws may be mounted upon the withdrawn arbor, whereupon the machine may be quickly reassembled.

I have herein illustrated and described a preferred embodiment of the present invention but it should be readily apparent to those skilled in the art that many modifications in detail and arrangement are permissible. All such modifications as come within the true spirit and scope of the appended claims are considered to be a part of my invention.

I claim:

1. An edger or the like comprising an arbor, a plurality of disc saws mounted on said arbor and slidable therealong, a plurality of saw shifting members each engaging one of said saws for controlling the position thereof along said arbor, a plurality of cylinder and piston means each including a reciprocable piston rod, each of said piston rods being operatively connected to a separate one of said saw shifting members, means for moving said piston rods independently of each other including a plurality of piston rod controlling valves arranged in pairs, each pair of piston rod controlling valves comprising one valve operatively associated with one of said piston rods for moving it in one direction and a second valve operatively associated with said one piston rod for moving it in the opposite direction, a support associated with said arbor, a plurality of switch assemblies slidably mounted on said support and manually movable therealong independently of each other, a control circuit including a plurality of valve operators each individually associated with one of said piston rod controlling valves, said control circuit including switch means in each of said switch assemblies, each of said switch means controlling a pair of said valve operators, and a switch arm movable from a neutral position in either direction to close one of said switch means, and a plurality of switch operators each connected to and movable with one of said saw shifting members and operatively engageable with one of said switch arms.

2. The structure set forth in claim 1 wherein each of said switch arms comprises a bifurcated end so positioned as to straddle its associated switch operator when in neutral position, said switch arm being rockable by said switch operator in either direction to complete a valve controlling circuit.

3. The structure set forth in claim 1 wherein each of said switch assemblies includes a pivoted switch arm, a bifurcated member connected to said arm and so positioned as to straddle the associated switch operator when in neutral position, and friction means engaging said arm to hold it in whatever position it is moved to by said operator.

4. The structure set forth in claim 1 wherein each of said switch assemblies comprises a manually shiftable carriage including a first pointer, said support includes a scale along which said first pointers move, each of said switch operators includes a second pointer movable therewith, and said support includes a scale along which said second pointers move.

5. The structure set forth in claim 1 wherein a manually shiftable carriage supports each of said switch assemblies, and said support includes a scale along which said carriage moves.

6. The structure set forth in claim 1 wherein each of said switch assemblies includes a pointer, and said support includes a scale along which said pointers move.

7. The structure set forth in claim 1 wherein each of said switch assemblies includes a first pointer and said support includes a scale along which said first pointers move, and each of said switch operators includes a second pointer movable therewith.

LESTER J. PETERS.

REFERENCES CITED

The following references are of record in the file of this patent:

UNITED STATES PATENTS

| Number | Name | Date |
|---|---|---|
| 259,702 | McDonough | June 20, 1882 |
| 428,940 | Patullo | May 27, 1890 |
| 714,098 | Caldwell | Nov. 18, 1902 |
| 738,296 | Cook | Sept. 8, 1903 |
| 837,444 | Willett | Dec. 4, 1906 |
| 941,751 | Anderson | Nov. 30, 1909 |
| 1,337,882 | Bott | Apr. 20, 1920 |
| 1,835,041 | Hagmeier et al. | Dec. 8, 1931 |
| 2,149,235 | Stone | Feb. 28, 1939 |

FOREIGN PATENTS

| Number | Country | Date |
|---|---|---|
| 115,610 | Australia | July 23, 1942 |